United States Patent
Zalewski

(10) Patent No.: US 10,649,094 B2
(45) Date of Patent: May 12, 2020

(54) MULTIPATH IDENTIFICATION BY COMPARING TWO DIFFERENT GNSS SIGNALS

(71) Applicant: Continental Teves AG & Co. oHG, Frankfurt (DE)

(72) Inventor: Michael Zalewski, Frankfurt am Main (DE)

(73) Assignee: Continental Teves AG & Co. oHG, Frankfurt (DE)

(*) Notice: Subject to any disclaimer, the term of this patent is extended or adjusted under 35 U.S.C. 154(b) by 186 days.

(21) Appl. No.: 15/545,164

(22) PCT Filed: Feb. 24, 2016

(86) PCT No.: PCT/EP2016/053886
§ 371 (c)(1),
(2) Date: Jul. 20, 2017

(87) PCT Pub. No.: WO2016/135205
PCT Pub. Date: Sep. 1, 2016

(65) Prior Publication Data
US 2018/0011198 A1    Jan. 11, 2018

(30) Foreign Application Priority Data
Feb. 27, 2015    (DE) .................. 10 2015 203 616

(51) Int. Cl.
*G01S 19/22* (2010.01)
*G01S 19/32* (2010.01)

(52) U.S. Cl.
CPC .............. *G01S 19/22* (2013.01); *G01S 19/32* (2013.01)

(58) Field of Classification Search
CPC .......... G01S 19/21; G01S 19/22; G01S 19/32; G01S 19/428
(Continued)

(56) References Cited

U.S. PATENT DOCUMENTS 5,781,152 A    7/1998   Renard et al.
5,903,654 A    5/1999   Milton et al.
(Continued)

FOREIGN PATENT DOCUMENTS

CN    101334461 A    12/2008
CN    102907151 A    1/2013
(Continued)

OTHER PUBLICATIONS

International Preliminary Report on Patentability and Written Opinion for International Application No. PCT/EP2016/053886, dated Aug. 29, 2017, 11 pages.
(Continued)

*Primary Examiner* — Dao L Phan
(74) *Attorney, Agent, or Firm* — RatnerPrestia

(57) ABSTRACT

A method for detecting a multipath effect in a GNSS receiver which is designed to receive different signals from a GNSS satellite and includes a parameter which is determined from directly received signals and has a substantially constant target value, including the steps receiving at least two mutually independent signals; determining a current parameter value from at least the first and the second signal; evaluating the parameter value in relation to the target value, and detecting a multipath effect when the parameter value has a deviation (ΔK) which deviates from the already known target value.

14 Claims, 3 Drawing Sheets

(58) Field of Classification Search
USPC .................................................. 342/357.61
See application file for complete search history.

(56) References Cited

U.S. PATENT DOCUMENTS

| | | |
|---|---|---|
| 7,586,441 B2 | 9/2009 | Huang et al. |
| 8,494,566 B2 | 7/2013 | Chen et al. |
| 2009/0079626 A1 | 3/2009 | Kobayashi |
| 2014/0375495 A1 | 12/2014 | Fleming et al. |

FOREIGN PATENT DOCUMENTS

| | | | |
|---|---|---|---|
| CN | 104237920 | A | 12/2014 |
| DE | 69616950 | T2 | 7/2002 |
| EP | 2674782 | A1 | 12/2013 |
| JP | 2009063479 | A | 3/2009 |
| WO | 2008025151 | A1 | 3/2008 |

OTHER PUBLICATIONS

International Search Report and Written Opinion for International Application No. PCT/EP2016/053886, dated Sep. 9, 2016, 16 pages.
German Search Report for German Application No. 10 2015 203 616.2, dated Dec. 16, 2015, including partial English translation, 10 pages.
Yamada, H., et al., "Application of Ionosphere Correction for Enhanced Multi-GNSS Positioning," Jan. 29, 2014, pp. 483-487, Proceedings of the 2014 International Technical Meeting of the Institute of Navigation, ITM 2014, San Diego, CA XP056008109.
Chinese Office Action for Chinese Application No. 201680006712.1, dated Aug. 6, 2019 with translation, 15 pages.

MULTIPATH IDENTIFICATION BY COMPARING TWO DIFFERENT GNSS SIGNALS

CROSS REFERENCE TO RELATED APPLICATIONS

This application is the U.S. National Phase application of PCT International Application No. PCT/EP2016/053886, filed Feb. 24, 2016, which claims priority to German Patent Application No. 10 2015 203 616.2, filed Feb. 27, 2015, the contents of such applications being incorporated by reference herein.

FIELD OF THE INVENTION

The invention relates to a method for detecting a multipath effect in a GNSS receiver and a system for a motor vehicle for carrying out such a method.

BACKGROUND OF THE INVENTION

The term multipath is also commonly known, amongst other things, as multiway propagation. The term multipath will be used hereinafter as a synonym for multiway propagation. It describes the circumstance in which a signal, e.g. from a satellite, reaches the receiver not only on the direct path, but also indirectly after it has previously been reflected against an object in the environment. This circumstance is not only applicable to satellite signals, but also to any signals transmitted by electromagnetic waves, wherein the effects in satellite navigation result in particularly noticeable deviations in position determination. The deviations occur both with a constructive and with a destructive interference between the reflected and the original signal. It is therefore important to identify such signals to increase the precision during position determination.

Position-based functions are becoming increasingly important in the field of application of motor vehicles. Owing to the increasing demand for computing power in relation to the low growth in computing power due to high cost pressures, a method is required which enables multipath signals to be detected in a simple manner.

SUMMARY OF THE INVENTION

An aspect of the invention, therefore, is to demonstrate a method or a system whereby it is possible, in a simple manner, to detect whether a signal has reached a receiver on the direct or indirect path.

According to the method according to an aspect of the invention, it is proposed that, by means of a global navigation satellite system (GNSS) receiver, different signals are received from a GNSS satellite, wherein the GNSS receiver includes a parameter which is determined from directly received signals and has a substantially constant target value, and wherein the method comprises the steps:

receiving at least two mutually independent signals which are preferably based on a measured value, determining a current parameter value from at least the first and the second signal, evaluating the parameter value in relation to the target value, and detecting a multipath effect when the parameter value has a deviation which deviates from the already known target value.

An aspect of the invention is based on the basic idea of using the changes in the parameter value to detect multipath effects on received signals. An essential feature here is the assumption that the parameter in a normal case, i.e. without influence from multipath effects, is substantially constant but changes markedly as a result of multipath effects. The detection of multipath effects can therefore be realized from the difference between the target value of the parameter and a current determined parameter value.

This parameter value is determinable from at least two different signals. Without multipath effects on the signals, the parameter value is, and remains, substantially constant and therefore corresponds to the target value of the parameter or the target parameter value. If this parameter value is determined on the basis of currently received signals which have been changed by multipath effects, the current parameter value deviates from the constant target parameter value. If the current parameter value from two received signals deviates substantially from the target parameter value, it can be concluded from this that one of the two, or both, received signals has or have previously experienced a reflection against an object. Through continuous observation or determination of the current parameter value from two currently received signals and the comparison of the current parameter value with the target parameter value, an influence from multipath effects can be established for each pair of received signals. The parameter value can be formed, for example, from the ratio between an offset of the first signal and an offset of the second signal. The offset is preferably an offset in the travel-time measurement.

The target parameter value must firstly be determined and available. It can be left open here as to how the target value of the parameter is determined and how often this is updated. As soon as the target parameter value is determined, this can be assumed to be constant for a certain time period.

An essential condition is that the received signals or such a signal enable a conclusion about the same measured value, although they represent mutually independent signals. Such a measured value can be e.g. the travel time of the signals in relation to the same instant at which the signals were transmitted from a satellite. The signals therefore enable the receiver to determine the same measured value on two different paths. It is, for example, possible to carry out, for each signal, a travel-time measurement which is independent of the other signal so that it can be established whether both signals deliver approximately the same result.

The signals preferably have different carrier signals or carrier frequencies. An example of different carrier signals in the field of application of navigation satellites are e.g. C/A code signals and P/Y code signals. An example of signals with different carrier frequencies are signals at L1, L2 or L5.

The method is applicable to a plurality of global satellite navigation systems current today, such as, for example, GPS, Galileo, Glonass and BeiDou.

The method according to an aspect of the invention is preferably further developed in that the parameter value includes an atmospherically induced error in the signals. The parameter value takes into account the delay in receiving the signals caused by the troposphere and ionosphere. The deviation in the travel time of the signals owing to atmospheric influences should therefore particularly preferably be used as a parameter. The calculation of atmospherically induced influences on the travel time is generally available in GNSS receivers in motor-driven road vehicles, which means that additional computing costs are not necessary here. The correlation of the current parameter value with the target value described here is realizable with low computing costs. It is moreover particularly advantageous for the use of the method in a motor-driven road vehicle, since the assumption of the constant target value is applicable to within a limited movement circle with sufficiently high accuracy.

The method according to an aspect of the invention is preferably further developed in that the target value of the parameter is newly determined after expiry of a predefined period, upon the occurrence of a predefined event or upon environmental changes. It is thus ensured that the desired value remains as current as possible.

The method according to an aspect of the invention is preferably further developed in that the parameter value exceeds a predefined upper and lower threshold value.

A broadening of the method such that the upper and lower threshold value is specified in relation to the target value of the parameter or to an absolute value is particularly advantageous here.

A particularly advantageous further development of the method according to an aspect of the invention moreover involves one of the threshold values being exceeded substantially without warning, i.e. the value of the parameter changes suddenly or instantaneously and exceeds one of the threshold values. A clear, but possibly isolated, influence of the multipath effect is thus detectable. The time period to be observed can be restricted, for example, to the number of one or several data or samples. It could, for example, also be in the range of fractions of a second.

A further advantageous embodiment of the method according to an aspect of the invention takes into account a deviation in which the parameter value exceeds a first tolerance range within a predefined time period. The time period to be applied here is substantially greater than the time period of the above-mentioned embodiment. The time domain could be, for example, in the range of a plurality of seconds. A duration of 5 seconds has proven advantageous in initial tests.

The preceding further development of the method according to an aspect of the invention is advantageously combined to take into account whether the change over time of the parameter or the difference or deviation of the parameter has a trend. Creeping effects (drift) caused by multipath are thus detectable, which, owing to the low amplitude of the deviation, could otherwise remain within a tolerable deviation.

The method according to an aspect of the invention is advantageously further developed here in that the first tolerance range is set in relation to or depending on a measured value from the first and/or second signal. The magnitude of the deviation over the time period can thus be flexibly adapted to a respective signal value in order to adapt the sensitivity of the multipath detection.

An advantageous embodiment of the method according to an aspect of the invention furthermore includes a deviation in which the parameter value exceeds a second tolerance range.

The method according to an aspect of the invention can particularly advantageously be further developed here in such a way that the second tolerance range is set in relation to the signal strength of the first and/or the second signal. An influence of multipath on the noise behavior of the signals can thus be taken into better account.

The method according to an aspect of the invention is advantageously further developed in that the signals differ in terms of their carrier frequency.

The method according to an aspect of the invention is advantageously further developed in that the signals differ in terms of their modulation frequency.

The method according to an aspect of the invention is advantageously further developed in that a C/A signal and a P/Y signal are compared with one another.

It is furthermore advantageous to further develop the method according to an aspect of the invention such that an L1 signal and an L2 or L5 signal or other combinations of the carrier frequencies of a GNSS are compared with one another.

The method according to an aspect of the invention is advantageously further developed in that, after detecting a multipath effect, the received GNSS signals are marked as erroneous.

A second aspect of the invention relates to a system appropriate for a motor vehicle for receiving satellite signals to determine the actual position of the vehicle and to implement a method according to one of the above-mentioned embodiments, wherein the receiver is designed to receive and to process signals of different frequencies.

The system is preferably a sensor fusion system for combining a plurality of sensor data with different output variables.

BRIEF DESCRIPTION OF THE DRAWINGS

The invention is described in more detail below with reference to an exemplary embodiment and drawings, which show.

DETAILED DESCRIPTION OF THE PREFERRED EMBODIMENTS

Figure 1:
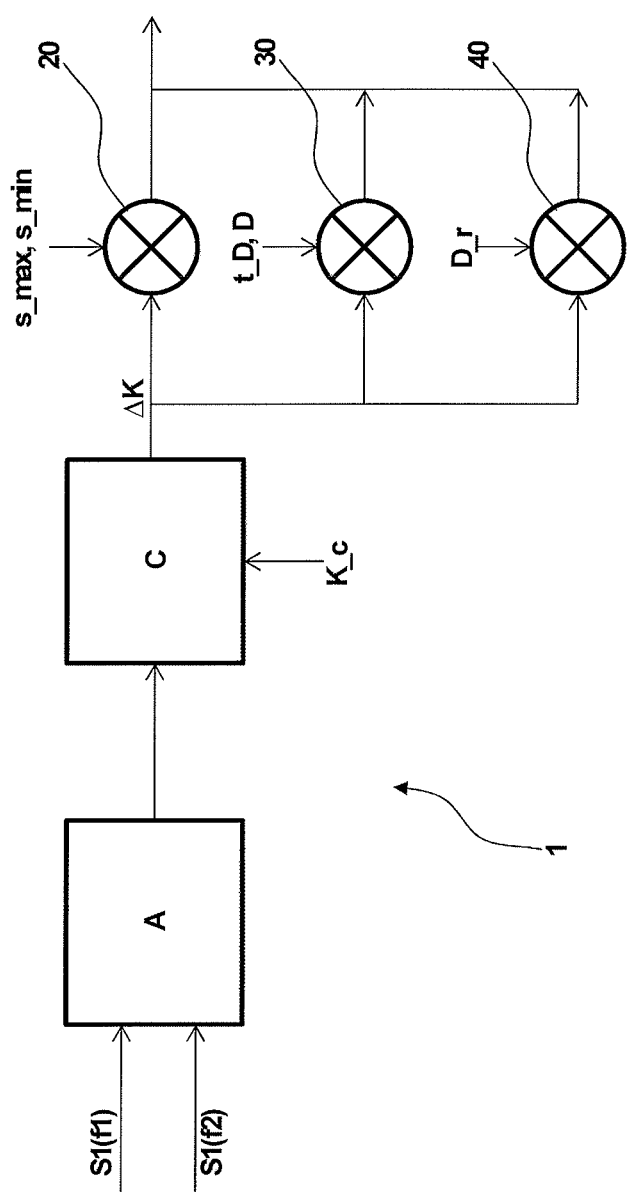
FIG. 1 a block diagram of a system according to the invention for implementing the method according to the invention.

FIG. 1 shows an exemplary embodiment of a system 1 according to an aspect of the invention, including a receiver or multi-frequency receiver A, which is designed to receive two different mutually independent signals S1, S2 at different frequencies f1, f2. A multi-frequency receiver A of this type is well known from the prior art.

The choice of signals to be observed can be made depending on the receiver and the availability of the signals. However, it is advantageous to use two signals which differ in terms of their carrier frequency, modulation frequency and/or signal type, for example C/A and P/Y signal. It is also possible to use more than two signals for multipath evaluation.

Figure 2:
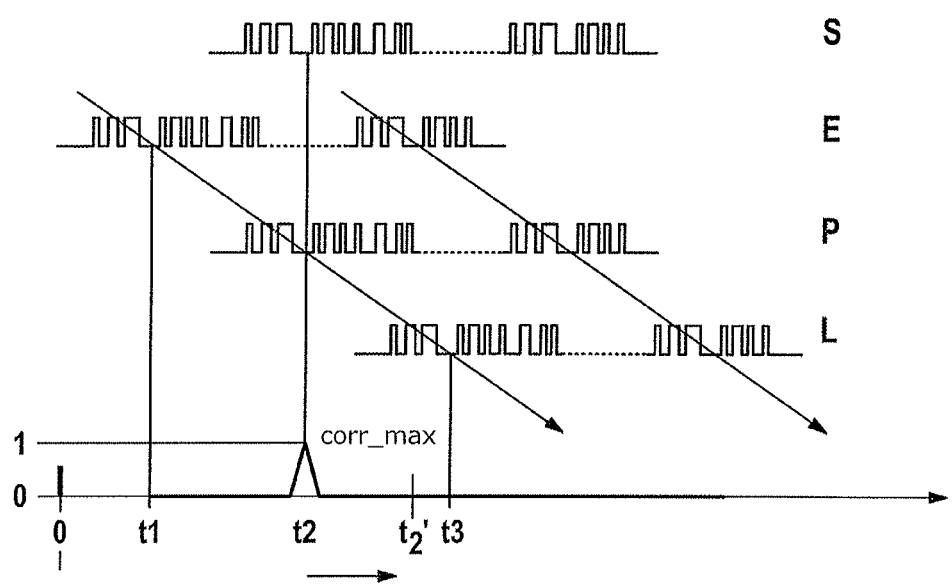
FIG. 2 an exemplary illustration of a travel-time measurement of a signal.

FIG. 2 shows the correlation of 3 phase-shifted replicas to a received signal S, namely E (Early), P (Prompt) and L (Late). The time shift is applied to the x-coordinate, wherein the point of origin represents the start of the time mark of the receiver. For brevity of terminology, the common English scientific terms for the replica signals are used below.

The phase shift from Prompt to the other replicas Early and Late amounts to one nav-chip length in each case, which corresponds to 10 ms for a C/A code and 1 ms for a P/Y code. The illustration in FIG. 2 shows the necessary time shift of the replicas Early and Late so that they correspond with the received signal S. This results in the travel-time measurement with a duration of t2 for the correlation maximum corr_max.

If, instead of only one signal, two signals S1, S2 are now received and the distance from the satellite or the signal travel-time measurement therefor is determined for both signals in relation to the same instant, for example C/A and P/Y code, the results should be approximately identical since both signals S1, S2 should have the same distance from the satellite at the same instant.

Reflections have a slightly different effect on the different signals. Added to this are influences resulting from different measuring methods owing to different sampling rates and resolutions.

A signal which is distorted by multipath would therefore result in the instant t2 at which the replica signal Prompt reaches the correlation maximum corr-max with the received signal being shifted by a certain value to t2', for example 5% of the nav-chip length. The result of such a shift would be that the multipath influence on a signal would amount to 500 μs=149500 m according to the C/A code and yet only 50 μs=14950 m based on the P/Y code. Since the distance between C/A and P/Y should be approximately identical but, in this exemplary case, there is a mutual deviation of 135 km, the multipath can be detected via the method.

Figure 3A:
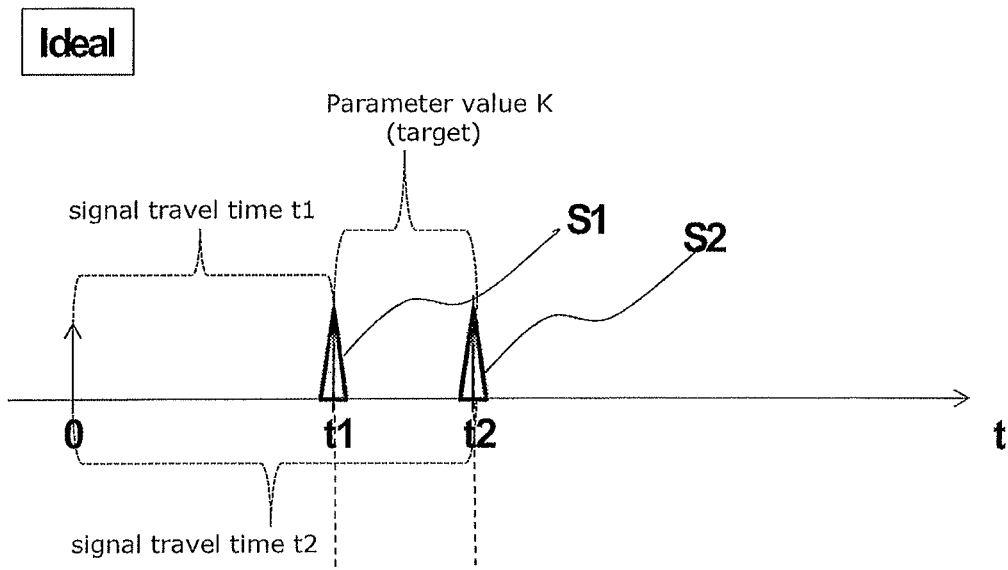
FIG. 3a, 3b an exemplary illustration of the parameter determination with reference to the travel-time measurement of two signals.
Figure 3B:
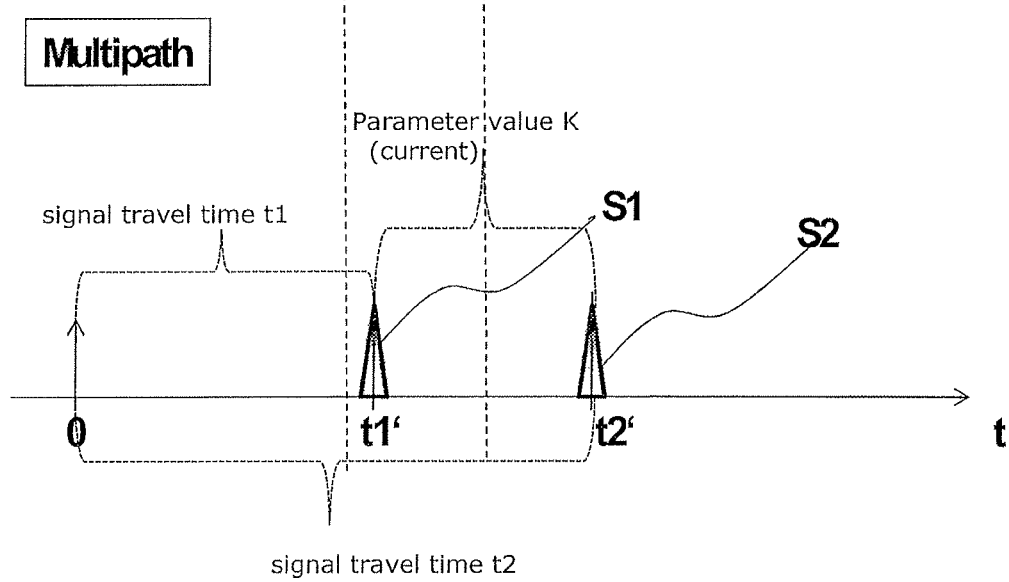

FIGS. 3a and 3b show the correlation peak and therefore the signal travel time for the signals S1 and S2.

FIG. 3a shows the offset of both signals under ideal conditions and therefore forms the target value of the parameter. Since, owing to different signal properties (e.g.: different frequencies), the signal travel time of both signals is slightly different—signal 2 is more delayed on the transmission path (e.g. as a result of the ionosphere)—the result is a mutual offset of both signals.

FIG. 3b shows how the current parameter value changes when multipath is present, which has a different effect on the two signals owing to different signal properties. Signal S1 and S2 are both delayed by the multipath, but signal S2 is more delayed than S1.

It is therefore possible to detect a multipath effect from the changed offset between the two signals S1 and S2. The target value of the parameter would then be the difference or the offset in the travel-time measurement between the two signals S1, S2, preferably minus the respective distortion of the travel times due to atmospheric factors. The current parameter value would then need to be determined on the basis of the currently received signals, one of which can be falsified by multipath.

The normal target value of the parameter could have, for example, an offset of 5 m between the signals. If the current parameter value, i.e. offset for a signal pair, jumps to 15 m, it should be assumed that a multipath effect is present. The difference between the two signals can also be determined in other units, for example in nav-chip lengths.

A further example for a parameter is described below. The influence of atmospheric disturbance effects can be determined from the received signals by means of multi-frequency receivers. This variable can likewise be used as a parameter. It takes into account, amongst other things, the influence of the ionosphere and troposphere on the breaking and absorption of the signals. The parameter depends for the most part on a plurality of factors in the ionosphere and troposphere, such as e.g. time of day, humidity, temperature, cloud cover etc. and can be assumed to be constant over a certain time period. Based on this assumption, the target value of the parameter can also be used as a constant offset. If the target value is subtracted from the current parameter value or the current atmospheric offset, a residual difference remains which is not atmospherically induced and can be attributed to multipath effects. The differential value determined in this way is therefore also suitable for detecting different types of deviation due to multipath.

A parameter within the context of the invention is therefore preferably an offset between the received signals, which generally has a constant value and can have different deviations from the target value as a result of multipath.

For the comparison between the target value and the current parameter value, the system 1 has a computing unit C which determines the difference K from the two variables. The system furthermore has a plurality of comparison units 20, 30, 40 which are suitable for detecting unique, creeping multipath effects or an influence on noise behavior of the signals which is changed by multipath based on the difference $\Delta K$.

The first comparison unit 20 compares the difference $\Delta K$ in relation to an upper and lower threshold value s_max, s_min. The threshold values can be specified relatively in relation to the target value of the parameter or in relation to an absolute value. If the difference K exceeds one of these threshold values s_max, s_min, it can be established that one of the signals S1, S2 has not reached the receiver on the direct path and is therefore erroneous and should be discarded. It is thus possible to detect individual runaways in the parameter value owing to multipath effects.

The second comparison unit 30 checks whether a slow or creeping change in the difference $\Delta K$ is present. To this end, a time period t_D is defined, in which the difference $\Delta K$ must remain within a tolerance range D. A so-called drift of the signals cased by multipath is thus detectable. The current parameter value, or the offset in the travel-time measurement, could change by several millimeters per second within several seconds. The tolerance range specified for a time period or a time window ensures that such drifts are detected.

The comparison unit 40 takes into account whether the multipath has a negative effect on the noise behavior. To this end, a further tolerance range D_r is introduced, which is set depending on the signal strength.

The invention has the advantage that the computing costs for detecting multipath effects are relatively low, since it is only necessary to determine the current parameter value from the two signals and to compare it with a substantially constant target parameter value.

The invention claimed is:

1. A method for detecting a multipath effect in a GNSS receiver which is designed to receive different signals from a GNSS satellite, comprising:
   receiving at least two mutually independent signals, the signals including a first signal having a first frequency and a second signal having a second frequency different than the first frequency,
   determining a phase shift between at least the first signal and the second signal,
   evaluating the phase shift in relation to a target phase shift determined from an expected phase shift between the first signal and the second signal when directly received by the GNSS receiver, and
   detecting a multipath effect when the evaluation indicates that the phase shift:
   is less than a lower phase shift threshold that is less than the target phase shift, or
   is greater than an upper phase shift threshold that is greater than the target phase shift.

2. The method according to claim 1, wherein the phase shift is caused in part by atmospherically induced error in the signals.

3. The method according to claim 2, wherein the target shift is newly determined after expiry of a predefined period, upon the occurrence of a predefined event or upon environmental changes.

4. The method according to claim 1, further comprising:
   detecting the multipath effect when the evaluation indicates that the phase shift is less than the lower phase shift threshold or greater than the upper phase shift threshold within a predefined time period.

5. The method according to claim 4, wherein a change in the phase shift over time indicates a trend.

6. The method according to claim 4, wherein the lower phase shift threshold is set in relation to a measured value from the first and/or second signal.

7. The method according to claim 4, wherein the upper phase shift threshold is set in relation to the signal strength of the first and/or the second signal.

8. The method according to claim 1, wherein the signals differ in terms of their carrier frequency.

9. The method according to claim 1, wherein a GNSS L1 signal and an L2 or L5 signal or other combinations of the carrier frequencies are compared with one another.

10. The method according to claim 1, wherein the signals differ in terms of their modulation frequency.

11. The method according to claim 1, wherein a C/A signal and P/Y signal are compared with one another.

12. The method according to claim 1, wherein, after detecting a multipath effect, the received GNSS signals are marked as erroneous.

13. A system for a motor vehicle, having a receiver for receiving satellite signals for determining an actual position and for implementing a method according to claim 1, wherein the receiver is designed to receive and to process signals of different frequencies.

14. The method according to claim 5, wherein the lower phase shift threshold is set in relation to a measured value from the first and/or second signal.

* * * * *